July 6, 1965  A. C. KORTE  3,193,043
CARBURETOR
Filed Feb. 21, 1962
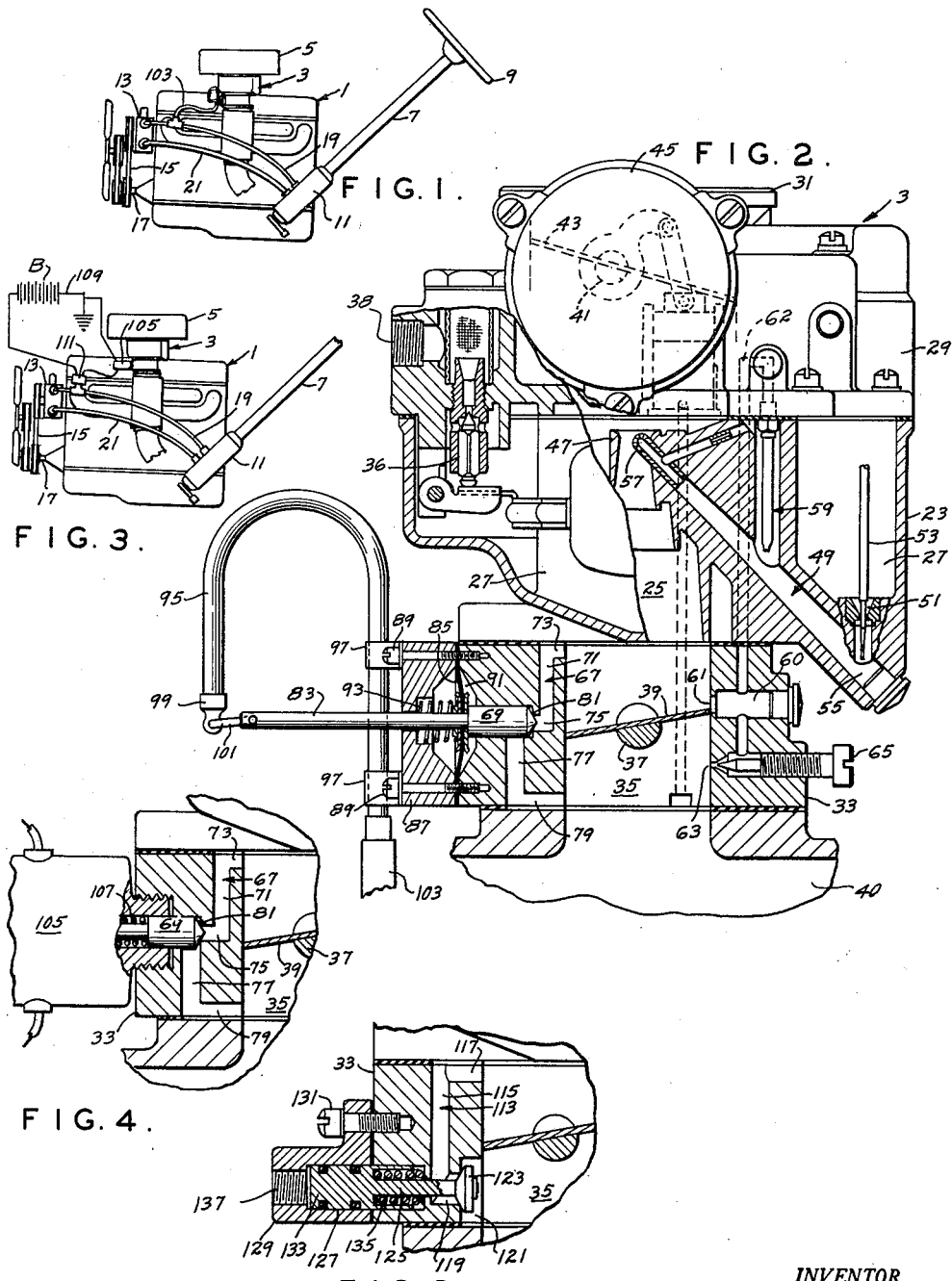
INVENTOR.
ALFRED C. KORTE
BY
AGENT United States Patent Office 3,193,043
Patented July 6, 1965

3,193,043
CARBURETOR
Alfred C. Korte, Jennings, Mo., assignor to ACF Industries, Incorporated, New York, N.Y., a corporation of New Jersey
Filed Feb. 21, 1962, Ser. No. 174,813
4 Claims. (Cl. 130—77)

This invention relates to means for controlling the speed of an internal combustion engine of an automotive vehicle having an accessory powered from the engine, adapted to prevent stalling of the engine under conditions of high demand of the accessory with attendant increased load on the engine, and more particularly to a speed control system of this character for the engine of an automotive vehicle equipped with a power steering system.

A typical power steering system for an automotive vehicle comprises a hydraulically operated power means for power assist in turning the front wheels of the vehicle. This power means is supplied with hydraulic fluid (such as oil) under pressure by a hydraulic pump driven by the engine of the vehicle. When the front wheels of the vehicle equipped with such a power steering system are cramped left or right under conditions of maximum resistance to turning of the wheels, as for example, when parking the vehicle or pulling out of a parking space, the front wheels are cramped left or right with the vehicle at rest, a relatively heavy load is placed on the pump and hence on the engine. Under such conditions, the idle speed of the engine may drop below that necessary to maintain the engine in operation, and the engine will stall.

Accordingly, among the several objects of this invention may be noted the provision of a speed control system for the engine of an automotive vehicle having power steering which functions in response to turning of the steering wheel of the vehicle and resultant increase in load on the engine to increase the engine idle speed to tend to prevent stalling of the engine; and the provision of such a system which is economical to provide and reliable in operation. In general, the invention involves the provision of means operative on the means (such as a carburetor) for supplying a mixture of air and fuel to the engine for increasing engine speed in response to turning the steering wheel. More particularly, increase in engine speed is effected by increasing the flow of air to the engine, increased air flow being obtained by by-passing air around the throttle of the mixture supply means. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in side elevation of the engine of an automotive vehicle equipped with a power steering system and a speed control system of this invention;

FIG. 2 is an enlarged view in elevation with parts broken away and shown in section of a carburetor provided in accordance with this invention with an air by-pass and a valve controlling flow of air through the by-pass;

FIG. 3 is a view similar to FIG. 1 showing another type of speed control system of this invention;

FIG. 4 is a fragmentary view of a carburetor showing a modified type of control for the by-pass valve used in the FIG. 3 system; and FIG. 5 is a fragmentary view of a carburetor showing another type of by-pass valve and control therefor.

Corresponding reference characters indicate corresponding parts throughout the several views of the drawings.

Referring to the drawings, there is indicated at 1 in FIG. 1 the internal combustion engine of an automotive vehicle. At 3 is indicated the carburetor for the engine, and at 5 is indicated the usual air filter on the air horn of the carburetor. The steering column of the vehicle is indicated at 7, and the steering wheel of the vehicle is indicated at 9. A power steering gear is indicated at 11. This may be any one of various conventional hydraulically operated power steering gears such as the power steering gear shown on pages 12–30, Group 19 of the 1960 Chrysler and Imperial Service Manual, for example. It should be obvious that any other power steering system might be employed which utilizes a source of hydraulic fluid under pressure and a delivery and return conduit connecting the source to the steering gear. As will be understood, such a power steering gear generally comprises a hydraulic power cylinder supplied with hydraulic fluid (oil) under pressure by a pump 13 driven by a belt 15 from the crankshaft 17 of the engine. Lines for delivering fluid from the pump to the power cylinder and for returning fluid from the cylinder to the fluid reservoir associated with the pump are indicated at 19 and 21. It is inherent in the operation of such a power steering system that the pressure of fluid delivered by the pump is at a minimum when the steering wheel is in neutral or straight-ahead position, increasing as the wheel is turned left or right, maximum fluid pressure being developed when the wheels of the vehicle are fully cramped to left or right under conditions of maximum resistance to turning of the wheels. Accordingly, the power required for operating the pump is at a minimum when the front wheels of the vehicle are in straight-ahead position, increasing when they are turned left or right, and at a maximum when they are fully cramped to left or right under conditions of maximum resistance to turning of the wheels. When the wheels are so cramped, and in the absence of an engine speed control such as provided by this invention, the increased load of the pump on the engine may cause the idle speed of the engine to decrease to the point where the engine stalls. The control of this invention functions to increase engine idle speed under such conditions to prevent stalling.

Referring now to FIG. 2, the carburetor 3 is shown to comprise a main body 23 formed to provide a vertical mixture conduit 25 and fuel bowl 27, a bowl cover 29 having an air horn 31 for mixture conduit 25, and a throttle body 33 having a throttle bore 35 coaxial with and in continuation of the mixture conduit. A float type valve for controlling flow of fuel to the fuel bowl is indicated at 36. A throttle shaft 37 extends across the throttle bore and carries the throttle valve 39, which is constituted by a circular plate. Extending across the air horn is a choke valve shaft 41 carrying a choke valve 43. An automatic choke control is generally indicated at 45. A boost venturi comprising a metering jet 51 through which fuel may flow from the fuel bowl under control of a metering rod 53 to a passage 55 for delivery through a fuel nozzle 57 into the boost venturi. A carburetor idle system is generally indicated at 59, including idle ports 61 and 63 and an idle adturi 47 is provided in the mixture conduit. A high speed fuel system for the carburetor is generally indicated at 49, justing screw 65.

In operation, the engine is turned over and draws air through the air filter 5 and down into the fuel mixture passages 25 and 35 into the intake manifold 40 of the engine. Air passing through the booster venturi 47 causes a depression in air pressure around the nozzle 57, which sucks fuel up the main fuel passage 49 from the bowl 27. Fuel passes from the fuel bowl through the metering jet 51 controlled by the metering rod 53. When the engine is idling, the throttle valve 39 is in its closed position, as shown in FIG. 2. The manifold vacuum at this time is high and air is forced through the mixture conduit and into the idle port 61 where it mixes within an idle fuel chamber 60 with fuel sucked through the idle fuel passage 62 from the idle tube 59. The mixture of fuel and air from the idle chamber 60 is sucked out through the idle port 63 into the engine manifold to provide idling operation. The idle adjustment screw 65 may be varied to provide the appropriate idling speed.

Normally, the idle fuel/air mixture supplied to the engine manifold 40 is overly rich so as to permit the engine to operate at a low speed under varying idling conditions. Additional air brought into the intake manifold 40 during idling conditions will provide a more complete combustion of the idling fuel, thus providing more power to the engine with the effect of increasing the idle speed of the engine. A fast idle condition of the engine then can be utilized for picking up the load added to the engine by some accessory device, such as an air conditioning unit or a power device as power steering, for example. Without any means for increasing the engine idling speed or power, there normally results a stalling condition of the engine when a sudden load is added by connecting in an accessory as described.

In accordance with this invention, for increasing engine idle speed under the cramped-wheel conditions above mentioned, there is provided an air by-pass passage 67 around the throttle 39, and a valve 69 for controlling flow of air through this by-pass. As appears in FIG. 2, the by-pass is provided in the throttle body 33, having an upper vertical portion 71 extending down from a groove 73 in the top of throttle body which opens into the throttle bore 35 above the throttle valve, a horizontal portion 75 extending outward from the lower end of portion 71, and a lower vertical portion 77 extending down from the outer end of portion 75 to a groove 79 in the bottom of the throttle body which opens into the throttle bore below the throttle 39. The by-pass valve 69 is horizontally slidable in a hole of larger diameter than portion 75 of the by-pass extending outward from portion 75, and its forward end (its left end as viewed in FIG. 3) is of conical form adapted to seat against a conical valve seat 81 formed at the outer end of portion 75 of the by-pass passage.

The by-pass valve 69 has a stem 83 extending outward through a flexible diaphragm 85 having its margin clamped against the throttle body 33 by a cup 87 secured to the throttle body as indicated at 89. The throttle body has a recess at 91 to accommodate movement of the diaphragm. The diaphragm seals recess 91. A coil compression spring 93 surrounding valve stem 83 in the cup acts against the diaphragm and valve 69 to bias the latter to closed position against seat 81 blocking the by-pass 67.

Valve 69 is controlled in response to pressure in the power steering system. As shown in FIG. 2, for this purpose a Bourdon tube 95 is attached to the outside of cup 87 by clips such as indicated at 97. This tube is an elastic tube of inverted J-shape, closed at its free end as indicated at 99 and open at its other end. A link 101 connects the closed end of the tube and the valve stem 83. As shown in FIG. 1, a hose line 103 connects the open end of the tube 95 and the delivery line 19 which is connected between the outlet of pump 13 and the power steering gear 11. Tube 95 therefore holds hydraulic fluid under pump delivery pressure. Its free end tends to bend out due to the internal pressure of the fluid therein and pull the valve 69 open. The arrangement is made such, by suitable construction of the Bourdon tube and suitable selection of spring 93, that spring 93 normally restrains the free end of the tube from bending out so that valve 69 remains closed for pump delivery pressures up to a predetermined value which is developed on cramping of the front wheels of the vehicle as above described, at which predetermined pressure value the bias of spring 93 is overcome and the free end of the tube bends out and pulls valve 69 open.

Operation of the system shown in FIGS. 1 and 2 is as follows:

With the engine 1 idling, the throttle 39 is closed as appears in FIG. 2. As long as the pressure of the hydraulic fluid in Bourdon tube 95 does not exceed the predetermined value as above described, the air by-pass valve 69 remains closed, and the total air requirement for engine idling is supplied by the idle system 59 of the carburetor in the same manner as heretofore. Whenever the front wheels of the vehicle are cramped to such an extent as to cause the pressure of hydraulic fluid in line 19 and in the Bourdon tube 95 to rise to the above-mentioned predetermined valve-operating value, the free end of the Bourdon tube 95 bends outward and pulls valve 69 open to open up the air by-pass 67 around the throttle 39. Addition of air flowing through the by-pass around the throttle 39 to the air/fuel mixture supplied to the engine by the idle system 59 of the carburetor results in speeding up of the engine to tend to prevent it from stalling under the increased engine load resulting from the increased demand on pump 13 due to cramping of the wheels. The Bourdon tube 95 may be so formed and the spring 93 so selected as to provide for opening of the by-pass valve 69 for engine idle speed-up at any desired angle of the steering wheel of the vehicle either to left or right from the straight-head position.

FIGS. 3 and 4 illustrate a modification wherein valve 69 is a solenoid valve, the solenoid being indicated at 105. This includes a spring 107 for biasing the valve closed. As shown in FIG. 3, the solenoid is connected in series in an electric circuit 109 powered by the battery B of the vehicle with a pressure switch 111 in fluid delivery line 19. The pressure switch 111 is normally open for pump delivery pressures up to a predetermined value developed on cramping of the front wheels, and then closes. Upon closure of the pressure switch, solenoid 105 is energized to open valve 69, thereby opening up by-pass 67 for flow of air around the throttle 39 to increase the engine idle speed and prevent stalling.

FIG. 5 illustrates another possible modification in which the air by-pass passage 113 around the throttle 39 has a vertical portion 115 extending down from a groove 117 in the top of the throttle body 33 which opens into the throttle bore 35, and a horizontal portion 119 extending inward from the lower end of portion 115 to a recess 121 in the throttle body. This recess accommodates a by-pass valve 123 adapted to seat against the portion of the throttle body around the inner end of horizontal portion 119 of the by-pass. The valve is mounted on the end of a valve stem 125 which extends outward into a cylindric chamber 127 formed in the throttle body 33 and in a fitting 129 secured to the throttle body as indicated at 131. The valve stem is formed with a piston 133 slidable in chamber 127. A coil compression spring 135 reacts from the inner end of the chamber against the piston to bias the valve 123 closed. Fitting 129 has a port 137 for connection of line 103 (as in FIG. 1) so that the pressure of fluid delivered by pump 13 is applied to the outer end of the piston. Spring 135 holds valve 123 closed for pump delivery pressures below a predetermined value developed on cramping the wheels, and when the pressure reaches this value, piston 133 is driven toward the right as viewed in FIG. 5 to open by-pass valve 123, thereby opening up by-pass 113 for flow of air around the throttle to increase the engine idle speed and prevent stalling.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An automotive vehicle having an internal combustion engine, a steering wheel for turning the front wheels of the vehicle, a power assist for said steering wheel operable by fluid under pressure, a pump powered by the engine for delivering fluid under pressure to said power assist, said pressure increasing and said pump imposing increasing load on the engine upon cramping the front wheels of the vehicle, a carburetor for said engine having a mixture conduit, a throttle in said mixture conduit for controlling the flow of fuel and air into said engine, a bypass passage formed in said carburetor having one end thereof in communication with the mixture conduit anteriorly of the throttle and the other end thereof in communication with the mixture conduit posteriorly of the throttle, a valve in said bypass passage being movable between open and closed positions for allowing the flow of air around said throttle, means responsive to a predetermined increase in said fluid pressure for causing opening of said valve for allowing the flow of air into said engine for increasing the idle speed of said engine.

2. An automotive vehicle having an internal combustion engine, a steering wheel for turning the front wheels of the vehicle, a power assist for said steering wheel operable by fluid under pressure, a pump powered by the engine for delivering fluid under pressure to said power assist, said pressure increasing and said pump imposing increasing load on the engine upon cramping the front wheels of the vehicle, a carburetor for said engine having a mixture conduit, a throttle in said mixture conduit for controlling the flow of fuel and air into said engine, a bypass passage formed in said carburetor having one end thereof in communication with the mixture conduit anteriorly of the throttle and the other end thereof in communication with the mixture conduit posteriorly of the throttle, a valve in said bypass passage being movable between open and closed positions for allowing the flow of air around said throttle, a Bourdon tube having a fixed end thereof in communication with the pump delivery and a free end thereof connected to said valve, whereby said Bourdon tube will induce movement to said valve to open the same in response to a predetermined increase in the delivery pressure of said pump for allowing the flow of air into said engine for increasing the idle speed of said engine.

3. An automotive vehicle having an internal combustion engine, a steering wheel for turning the front wheels of the vehicle, a power assist for said steering wheel operable by fluid under pressure, a pump powered by the engine for delivering fluid under pressure to said power assist, said pressure increasing and said pump imposing increasing load on the engine upon cramping the front wheels of the vehicle, a carburetor for said engine having a mixture conduit, a throttle in said mixture conduit for controlling the flow of fuel and air into said engine, a bypass passage formed in said carburetor having one end thereof in communication with the mixture conduit anteriorly of the throttle and the other end thereof in communication with the mixture conduit posteriorly of the throttle, a valve in said bypass passage being movable between open and closed positions for allowing the flow of air around said throttle, a solenoid connected to said valve, electrical circuitry including a pressure actuated switch adapted to energize said solenoid, said pressure actuated switch being in communication with the pump delivery whereby said pressure actuated switch will be closed upon a predetermined increase in pump delivery pressure to cause energization of said circuitry and opening of said valve by said solenoid for allowing the flow of air into said engine for increasing the idle speed of said engine.

4. An automotive vehicle having an internal combustion engine, a steering wheel for turning the front wheels of the vehicle, a power assist for said steering wheel operable by fluid under pressure, a pump powered by the engine for delivering fluid under pressure to said power assist, said pressure increasing and said pump imposing increasing load on the engine upon cramping the front wheels of the vehicle, a carburetor for said engine having a mixture conduit, a throttle in said mixture conduit for controlling the flow of fuel and air into said engine, a bypass passage formed in said carburetor having one end thereof in communication with the mixture conduit anteriorly of the throttle and the other end thereof in communication with the mixture conduit posteriorly of the throttle, a valve in said bypass passage being movable between open and closed positions for allowing the flow of air around said throttle, a cylinder formed in said carburetor and being in fluid communication with said fluid under pressure, a piston in said cylinder being responsive to a predetermined increase in the pressure of said fluid to induce opening of said valve for allowing the flow of air into said engine for increasing the idle speed of said engine.

References Cited by the Examiner

UNITED STATES PATENTS

| | | | |
|---|---|---|---|
| 2,078,481 | 4/37 | Chananier | 261—63 X |
| 2,207,152 | 7/40 | Huber | 261—63 |
| 2,762,614 | 9/56 | Schweiss | 261—63 |
| 2,931,305 | 4/60 | Stratton | 180—77 X |
| 3,022,849 | 2/62 | Braun | 180—77 |
| 3,042,134 | 7/62 | Majewski | 180—77 |
| 3,103,128 | 9/63 | Gordon | 180—77 |

A. HARRY LEVY, *Primary Examiner.*

PHILIP ARNOLD, *Examiner.*